US010839334B2

(12) United States Patent
Sodani et al.

(10) Patent No.: US 10,839,334 B2
(45) Date of Patent: Nov. 17, 2020

(54) EVALUATING PERFORMANCE OF ORGANIZATIONAL UNITS USING HUMAN CAPITAL VALUES

(71) Applicant: Tata Consultancy Services Limited, Mumbai (IN)

(72) Inventors: Abhay Sodani, Pune (IN); Mangesh Sharad Gharote, Pune (IN); Rajiv Radheyshyam Srivastava, Pune (IN); Girish Keshav Palshikar, Pune (IN); Ankita Jain, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 774 days.

(21) Appl. No.: 15/056,602

(22) Filed: Feb. 29, 2016

(65) Prior Publication Data
US 2017/0024678 A1    Jan. 26, 2017

(30) Foreign Application Priority Data
Jul. 23, 2015   (IN) .......................... 2810/MUM/2015

(51) Int. Cl.
*G06Q 30/00*   (2012.01)
*G06Q 10/06*   (2012.01)
*G06Q 10/00*   (2012.01)

(52) U.S. Cl.
CPC ....... *G06Q 10/06398* (2013.01); *G06Q 10/00* (2013.01); *G06Q 10/06* (2013.01); *G06Q 10/0639* (2013.01)

(58) Field of Classification Search
CPC .......... G06Q 30/0255; G06Q 30/0235; G06Q 10/105; G06Q 10/103; G06Q 10/067;
(Continued)

(56) References Cited

U.S. PATENT DOCUMENTS

| 7,039,654 B1 | 5/2006 | Eder | |
|---|---|---|---|
| 2006/0020509 A1* | 1/2006 | Strain | G06Q 10/109 |
| | | | 705/14.25 |

(Continued)

OTHER PUBLICATIONS

Cross efficiency evaluation method based on weight-balanced data envelopment analysis model, School of Management, University of Science and Technology of China, Anhui Province, Hefei 230026, PR China, May 7, 2012, Wu, et al. (Year: 2012).*

(Continued)

*Primary Examiner* — Patricia H Munson
*Assistant Examiner* — Uche Byrd
(74) *Attorney, Agent, or Firm* — Finnegan, Henderson, Farabow, Garrett & Dunner LLP

(57) ABSTRACT

To evaluate performance of organizational units using Human Capital Value (HCV), the input data spread across an enterprise may be received from a user. The input data includes employee data, project related data, and organizational unit data for performance evaluation. The input data is analyzed for generating HCV variables. The HCV variables are stored in a repository (108). Further, the HCV variables may be parsed to determine an optimal set of variables. Based on the parsing, an efficiency of each organizational unit is computed. The computing is based on a Multi Criteria Decision Analysis (MCDA) technique. Based on the computing, the organizational units are ranked in a decreasing order of efficiency.

13 Claims, 3 Drawing Sheets

(58) Field of Classification Search
CPC .. G06Q 30/02; G06Q 10/06315; G06Q 40/00; G06Q 30/00; G06Q 30/06; H04Q 7/20
See application file for complete search history.

(56) References Cited

U.S. PATENT DOCUMENTS

| | | | | |
|---|---|---|---|---|
| 2007/0192266 A1* | 8/2007 | Tiwari | ................ | G06F 11/3447 706/45 |
| 2010/0100427 A1* | 4/2010 | McKeown | ........... | G06Q 10/067 705/322 |
| 2012/0239375 A1* | 9/2012 | Laxmanan | ............. | G06Q 10/06 703/22 |
| 2013/0297372 A1* | 11/2013 | Rix | ........................ | G06Q 10/10 705/7.27 |
| 2014/0136165 A1* | 5/2014 | Sarma | .................... | G06N 7/005 703/2 |
| 2016/0171398 A1* | 6/2016 | Eder | ...................... | G06Q 40/06 705/7.28 |

OTHER PUBLICATIONS

Ahmed et al., Employee performance evaluation: a fuzzy approach, International Journal of Productivity and Performance Management. (Year: 2013).*

Burns et al., Application of PCA/DEA method to evaluate the performance of human capital management: A case study, Journal of Data Envelopment Analysis and Decision Science. (Year: 2013).*

\* cited by examiner

US 10,839,334 B2

EVALUATING PERFORMANCE OF ORGANIZATIONAL UNITS USING HUMAN CAPITAL VALUES

PRIORITY CLAIM

This U.S. patent application claims priority under 35 U.S.C. § 119 to: India Application No. 2810/MUM/2015, filed on Jul. 23, 2015. The entire contents of the aforementioned application are incorporated herein by reference.

TECHNICAL FIELD

The present subject matter relates, in general, to evaluating performance of organizational units and, in particular, to evaluating performance of organization units using Human Capital Values (HCVs).

BACKGROUND

Performance measurement for an organizational unit facilitates in tracking progress and target setting, such that growth strategies may be implemented in an organization. Determining the performance of different units in the organization may vary from one organizational unit to another organizational unit. For example, performance for one organizational unit may be due to higher count of technical (competent) people, whereas the performance of another organizational unit within the same organization may be due to high leadership efforts. Thus, the performance of the organizational units is typically evaluated based on different performance indicators.

SUMMARY

Embodiments of the present disclosure present technological improvements as solutions to one or more of the above-mentioned technical problems recognized by the inventors in conventional systems.

In one implementation, a method for evaluating performance of organizational units using Human Capital Value (HCV) is disclosed. Initially, an input data spread across an enterprise from a user, wherein the input data comprises employee data, project related data, and organizational unit data for performance evaluation is received by the processor. In the next step, the input data for generating HCV variables, wherein the HCV variables are stored in a repository is analyzed by the processor. Further, a HCV variables is determined whether each of the plurality of HCV variables is one of an input variable, an output variable, and a variable to be neglected is parsed by the processor. Further, based on parsing, an optimal set of variables are determined by the processor and an efficiency of each organizational unit is computed based on the determining, the computing is based on a Multi Criteria Decision Analysis (MCDA) techniques, wherein the organizational units are ranked in a decreasing order based on the computing by the processor.

In one implementation a system for evaluating performance of organizational units using Human Capital Value (HCV) is disclosed. The system includes a memory and a processor coupled to the memory, wherein the processor is configured to receive input data spread across the enterprise from a user, wherein the input data comprises employee data, project related data, and organizational unit data for performance evaluation. Further, the processor is configured to analyze the input data for generating HCV variables, wherein the HCV variables are stored in a repository. Further an evaluation module executable by the processor is configured to compute efficiency of each organizational unit based on the identification, wherein the computation is based on a Multi Criteria Decision Analysis (MCDA) techniques; and rank each of the organizational unit based on the efficiency.

In one implementation, a computer program product having embodied thereon a computer program for evaluating performance of organizational units using Human Capital Value (HCV) is disclosed. The computer includes a program code for receiving Input data spread across an enterprise from a user, wherein the input data comprises employee data, project related data, and organizational unit data for performance evaluation. Further, a program code is implemented for analyzing the input data for generating HCV variables, wherein the HCV variables are stored in a repository. Further, a program code is implemented for parsing the HCV variables to determine whether each of the plurality of HCV variables is one of an input variable, an output variable, and a variable to be neglected. Further, a program code is implemented to determine the optimal set of variables and a program code is implemented for computing an efficiency of each organizational unit based on the determining, the computing is based on a Multi Criteria Decision Analysis (MCDA) techniques, wherein the organizational units are ranked in a decreasing order based on the computing.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
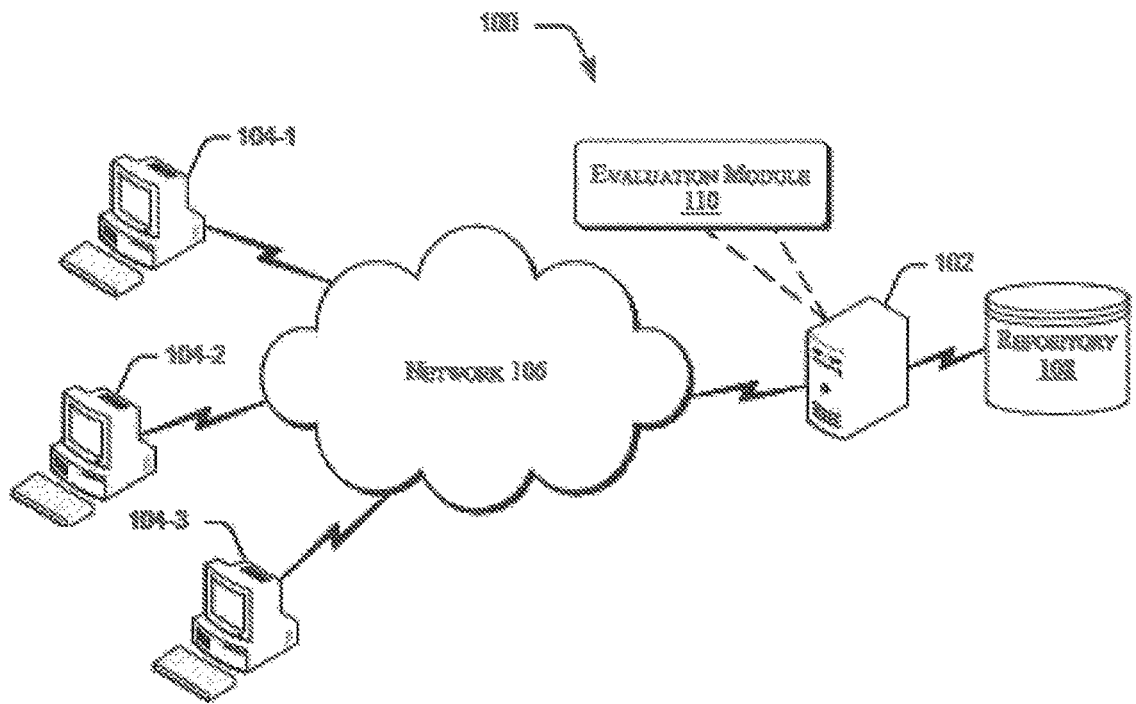
FIG. 1 illustrates a network environment implementing an evaluation system for evaluating performance of organizational units using HCV, in accordance with an embodiment of the present subject matter.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Systems and methods for evaluating performance of organizational units using HCV are described. To sustain in the competitive environment, efficient and effective performance management is of utmost importance for organizations. Generally, performance of organizational units within the organization is evaluated by analyzing financial measures, such as cost, revenue and profit generated by the organizational units each year. Current approaches for evaluating the organizational units do not consider other influential factors, such as skills, growth, and human capital that may also affect the performance of the organizational units.

Further, organizational growth may mean different things for different companies. Therefore, different companies may measure growth based on different parameters. As the ultimate goal of organizations is profitability, mostly, the companies measure growth in terms of their net profit and revenue. However, there are various factors apart from profit and revenue based on which growth of an organization may be measured. Examples of such factors may include, but are not limited to, employee's competency, capability, expertise, strength, quality, productivity, workforce skills, and physical expansion. Conventional methods of measuring growth of the organization are limited to financial growth of the organization and do not take into consideration the above factors. Thus, the conventional methods do not provide a holistic approach towards determination of performance of the organization.

Furthermore, measurement of human factors is subjective and therefore, is error prone. Moreover, certain hidden factors may influence output, quality of output, efficiency, and financial performance of organizations, such as effectiveness of leadership, resource allocation strategies, internal systems, and processes.

At various instances, while comparing the organizational units, the perspective of the company's top executives may differ from that of the branch level executive or with the Human Resource (HR) Management executive. Such situations may affect variable selection for computation of the efficiency of the organizational unit. For example, HR manager might be interested in identifying units where courses and the certifications completed by the employees are lagging, so as to plan for their trainings. In this case, the courses and certification completed by the employees would be treated as output variables. On the other hand, company executives might be interested in understanding the impact of high HC measure on the financial performance of the unit. In this case, many HC measures would be treated as input variables.

Many-a-times, there are scenarios which make model discovery a challenging task. For example, in a scenario where the executives provides ranking of the organizational units, determining the inputs and outputs for a model that match the ranking provided by these executives becomes difficult. This type of ranking we called as Ground Truth Ranking. In another scenario, where the ranking provided by the executives may be noisy. Here noisy means, the external ranks provided by executives can deviate within certain range because of varying perceptions. In yet another scenario, the variable set used for ranking may be completely unknown.

Accordingly, the present subject matter provides a system and a method for evaluating performance of organizational units using Human Capital Values (HCV). The present subject matter Includes an evaluation system. The evaluation system fetches and consolidates data, spread across the entire enterprise for the relevant measures. The input data includes employee data, project related data, and organizational unit data that may be pertaining to each organizational unit. For example, the employee data may include demographic information, performance, growth, learning, and the like. Based on this data, the evaluation system generates a plurality of HCV variables.

In an implementation, the evaluation system segregates the plurality of HCV variables into input variables and output variables. Based on the segregation, the evaluation system identifies an optimal set of variables from the plurality of HCV variables. In an example, the evaluation system may employ one or more techniques based on which the optimal set of variables is determined. In an example, the one or more techniques may include domain knowledge, automatic model discovery, and factional factorial model. The automatic model discovery facilitates in selecting the model that may be suitable for ranking various organizational units.

Further, the optimal set of variables may be processed by the evaluation system to compute efficiency of each organizational unit. The computation is based on a Multi Criteria Decision Analysis (MCDA) technique. In an example, to compute the efficiency of the organizational unit, the evaluation system may utilize the optimal set of variables as well as data against the optimal set of variables. In an implementation, the data against the optimal set of variables is provided by a repository. Further, the MCDA techniques may include Data Envelopment Analysis (DEA), Technique for Order of Preference by Similarity to Ideal Solution (TOPSIS), and Analytic Hierarchy Process (AHP). The automatic model discovery model facilitates in selecting Inputs and outputs for DEA model on the basis of rankings provided by an end-user, such as an executive and a manager. Details about the automatic model discovery technique are explained in later paragraphs of the specification.

In an implementation, once the efficiency of the organizational units is computed, the evaluation system may rank the organizational units in a decreasing order of their performance. In another implementation, the evaluation system may rank the organizational units based on user-defined weights that may be assigned to each HCV variable. In an example, a user may assign a main criteria measure and a sub-criteria measure under each main criteria measure based on the optimal set of variables. The main criteria measures of efficiency evaluation may be broadly categorized as Finance, Knowledge, Efforts, Project details, and so on. On the other hand, the sub-criteria measures are fine grained variables within this broader set of main criteria. In this case, efficiency is computed by taking ratio of weighted sum of output variables to weight sum of input variables.

In an implementation, the evaluation system may also calculate auxiliary measure values for each organizational unit. After calculating the auxiliary measure values, the evaluation system may rank each organizational unit in a decreasing order of the auxiliary measure values. Thereafter, the evaluation system may compute an average of these ranks for each organizational unit. The average rank of each organizational unit may be referred to as Auxiliary measure rank. The auxiliary measure ranks may be used to validate the ranks assigned to the organizational units.

Accordingly, the evaluation system of the present subject matter uses human capital related factors to evaluate efficiency of organizational units. The evaluation system captures and represents various factors based on experience, skill level, performance, business growth, and the like. The human capital related factors are selected by the evaluation system in addition to financial, experiential, business related factors for representing efficiency. Further, the evaluation system provides provision of employing more than one MCDA model to enable a user to compute ranks for the organizational units based on same set of variables. Based on the rankings, the evaluation system may also facilitate identification of low performing and high performing organizational units.

While aspects of the described system and method can be implemented in any number of different computing systems, environments, and/or configurations, embodiments for evaluating performance of organizational units using HCV are described in the context of the following exemplary system(s) and method(s).

FIG. 1 illustrates a network environment 100 implementing an evaluation system 102 for evaluating performance of organizational units using HCV, according to an example of the present subject matter. The evaluation system 102 may be implemented as, but is not limited to, desktop computers, hand-held devices, laptops, or other portable computers, tablet computers, and the like. The network environment 100, apart from the evaluation system 102, includes one or more computing devices 104-1, 104-2, ..., 104-N. For the purpose of explanation and clarity, the computing devices 104-1, 104-2, ..., 104-N, are hereinafter collectively referred to as computing devices 104 and hereinafter individually referred to as computing device 104.

In the network environment 100, the evaluation system 102 is connected to the computing devices 104 through a network 106. The network 106 may be a wireless network, wired network, or a combination thereof. The network 106 can be implemented as one of the different types of networks, such as intranet, telecom network, electrical network, local area network (LAN), wide area network (WAN), Virtual Private Network (VPN), internetwork, Global Area Network (GAN), the Internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, and storage devices.

Although the evaluation system 102 and the computing devices 104 are shown to be connected through a network 106, it would be appreciated by those skilled in the art that the evaluation system 102 and the computing devices 104 may be distributed locally or across one or more geographic locations and can be physically or logically connected to each other. The evaluation system 102 may be coupled to the computing devices 104 to receive information pertaining to selection of techniques that may be employed during evaluation of the efficiency of an organizational unit.

In an implementation, the evaluation system 102 may be coupled directly to a repository 108 through the network 106. Although not shown in the figure, it will be understood that the repository 108 may also be connected to the evaluation system 102 through the network 106. In an implementation, the repository 108 may store employee data, such as, demographic information, performance, and growth of various users.

Further, the evaluation system 100 may include an evaluation module 110. The evaluation module 110 may be configured to evaluate efficiency of an organizational unit based on a plurality of variables and data associated with the plurality of variables. The plurality of variables may be understood as an optimal set of variables that have been derived from a plurality of HCV variables. Details pertaining to the plurality of HCV variables may be described in later paragraphs of the description. In an example, the evaluation module 110 may employ Multi-Criteria Decision Analysis (MCDA) techniques for evaluating the efficiency of the organizational units. The MCDA techniques may include DEA based on convex limiting surface consisting of linear planes, Euclidean distance based techniques like TOPSIS, weighted ranking, averages of individual attribute ranking which identify an artificial minimum and maximum using available sample data. In an example, the user may select any of the MCDA techniques for evaluation of efficiency of the organizational units.

In an implementation, the Data Envelopment Analysis (DEA) model is applied by the evaluation system 102 to compute the relative efficiency of the organizational units. The DEA model is a linear programming technique used for estimating efficiency of an industry. In an example, the DEA model, such as a CCR model may be selected by a user for being applied on the optimal set of variables. The fractional formulation of the CCR model is provided as:

$$CRR \max_{u,v} \cdot \theta = \frac{\sum_{j=1}^{m} u_j y_{j0}}{\sum_{i=1}^{n} v_i X_{i0}} \qquad (1)$$

The fractional formulation is subject to, $$\frac{\sum_{j=1}^{m} u_j y_{jk}}{\sum_{i=1}^{n} v_i X_{ik}} \leq 1 \forall k = 1, \ldots, s \qquad (2)$$

where,
$u_1, u_2, u_3 \ldots u_m \geq 0$
$v_1, v_2, v_3 \ldots v_n \geq 0$
m=number of inputs
n=number of outputs
s=total number of Decision Making Units (DMUs)
o=DMUs under consideration In equations (1) and (2), the variables u and v represent weights of corresponding input and output variables. In the present implementation, the DMUs may be considered as the organizational units for which efficiency calculation is being performed. Further, the evaluation module 110 may be configured to determine optimal set of weights that maximize efficiency of DMUs under consideration. In an example, the optimal set of weights for input and output variables may be calculated using linear programming, taking constraints under consideration. The first constraint is the maximum possible ratio of each DMU using weights of DMU under consideration is 1. That means if the weights of $DMU_o$ assigned to other DMUs, the ratio of weight sum of output with weight sum of inputs should be less than or equal to one. Second and third constraint specifies that weights for input and output should not be negative.

In an example, the equations (1) and (2) facilitate in calculation of the efficiency of DMU under consideration by obtaining the optimal set of weights for input and output variables. It may be understood to a person skilled in the art that the set of weights varies from one DMU to another DMU. In addition, the CCR model facilitates in deriving weights from observed data instead of any fixed values. In the present example, the observed data may be understood as actual data that may be present in the repository 108 with respect to the HCV variables. Further, the weights are derived from the observed data using linear programming.

In an implementation, fractional formulation as represented in equation (1) may be transformed into a liner equation for ease in computation. The transformation into the linear equation is represented as:

$$CCR \max_{u,v} \theta = u_1 y_{10} + u_2 y_{20} + \ldots + u_m y_{m0} \tag{3}$$

wherein the transformation is subject to, $$v_1 X_{1k} + v_2 X_{2k} + v_3 X_{3k} + \ldots + v_n X_{nk} = 1 \tag{4}$$

and $$u_1 y_{10} + u_2 y_{20} + \ldots + u_m y_{m0} \leq v_1 X_{1k} + v_2 X_{2k} + v_3 X_{3k} + \ldots + v_n X_{nk} \tag{5}$$

where, $u_1, u_2, u_3 \ldots u_m \geq 0$
$v_1, v_2, v_3 \ldots v_n \geq 0$

In an example, another DEA model that may be selected by the user for computation of the efficiency of the organizational units may include dual form CCR model. In this example, the above-described CCR model may be used in dual form, as:

$$(\text{Dual}) \min_{\theta, \lambda} \theta \tag{6}$$

wherein the dual form CCR model is subject to, $$\Sigma_i \lambda_i x_{ji} \leq \theta x_{jp} \forall j \tag{7}$$

$$\Sigma_i \lambda_i y_{ki} \geq y_{kp} \forall k \tag{8}$$

$$\lambda > 0$$

where, p is the DMU under consideration and θ is the efficiency of this DMU.

In an implementation, the DEA model may include a Super Efficiency Model (SEM). The SEM may be used for ranking efficient DMUs of an organization. The SEM may relatively calculate the performance of efficient DMUs and rank the DMUs based on their efficiency. Accordingly, the SEM may calculate the efficiency of each DMU with respect to rest of the DMUs. In an example, if DMUs under consideration are removed from a reference set of all other DMU's of the DEA model, the resulting DEA model may be called as super efficiency model. In the present implementation, the SEM can be calculated in both scale CRS and VRS.

In the present implementation, super efficiency model is calculated using CCR (Primal) model $$CRR \max_{u,v} \theta = \frac{\sum_{j=1}^{m} u_j y_{j0}}{\sum_{i=1}^{n} v_i X_{i0}} \tag{9}$$

subject to, $$\frac{\sum_{j=1}^{m} u_j y_{jk}}{\sum_{i=1}^{n} v_i X_{ik}} \leq 1 \forall k \neq 0 \tag{10}$$

$u_1, u_2, u_3 \ldots u_m \geq 0$
$v_1, v_2, v_3 \ldots v_n \geq 0$

While calculating efficiency of the DMU under consideration, a weighted sum of output variables is computed. As shown in equation 10, the weighted sum of output variables should be less than the weighted sum of input variables for all DMUs except the DMU under consideration. In this case, DMU under consideration may be removed from constraint sets for allowing DMU efficiency score for this DMU exceed to 1.

In another implementation, the MCDA technique may include a cross-efficiency model. Cross Efficiency is another method for calculating relative efficiency of DMUs. In case of cross efficiency model, performance of one DMU with respect to the output optimal weights and input optimal weights of another DMU is computed. Such computation results in creation of a matrix called as a cross efficiency matrix. The cross efficiency matrix contains performance of each DMUs with respect to remaining other DMUs and may be uses to identify overall best performing organizational unit.

The cross efficiency model is a two-step process. In the first step, efficiency and optimal weights of each DMU is calculated with basic DEA model. In the second step, efficiency of DMU under consideration is calculated using optimal variable weights (as identified in the first step) of remaining all other DMUs. Average of all these efficiency represents Cross Efficiency Value of DMU under consideration. It will be understood to a person skilled in the art that the average of the efficiency is a simple average of the efficiencies obtained using variable weights of other DMUs for the DMU under consideration. Further, the above described steps may be repeated for each DMU and a Cross Efficiency Matrix (CEM) may be formed. An element $C_{ij}$ of the CEM is the efficiency of $j^{th}$ DMU with respect to the optimal weights of variables of $i^{th}$ DMU.

$$C_{ij} = \text{Eff}_j(u^i, v^i)$$

By averaging down the values of a column, the cross efficiency value of respective DMU may be calculated. In an example, the cross efficiency value is calculated by using the input and output weights of the DMU in consideration and input output weights of remaining DMUs. With the help of this, ranking of all DMUs is obtained for differentiating low performing and high performing DMUs. In an example, the cross efficiency model facilitates in performing analysis based on the variables weights which are internally derived rather than externally derived. Further, the cross efficiency model is used for validation of DEA model.

The above-described models employed by the evaluation system 102 facilitates in providing valuable insights about the organizational units. The insights may help in understanding shortcomings and improvement opportunities. For example, the various models indicate lacking areas and facilitate in setting of targets and better comprehensions and implementation of strategies.

Figure 2:
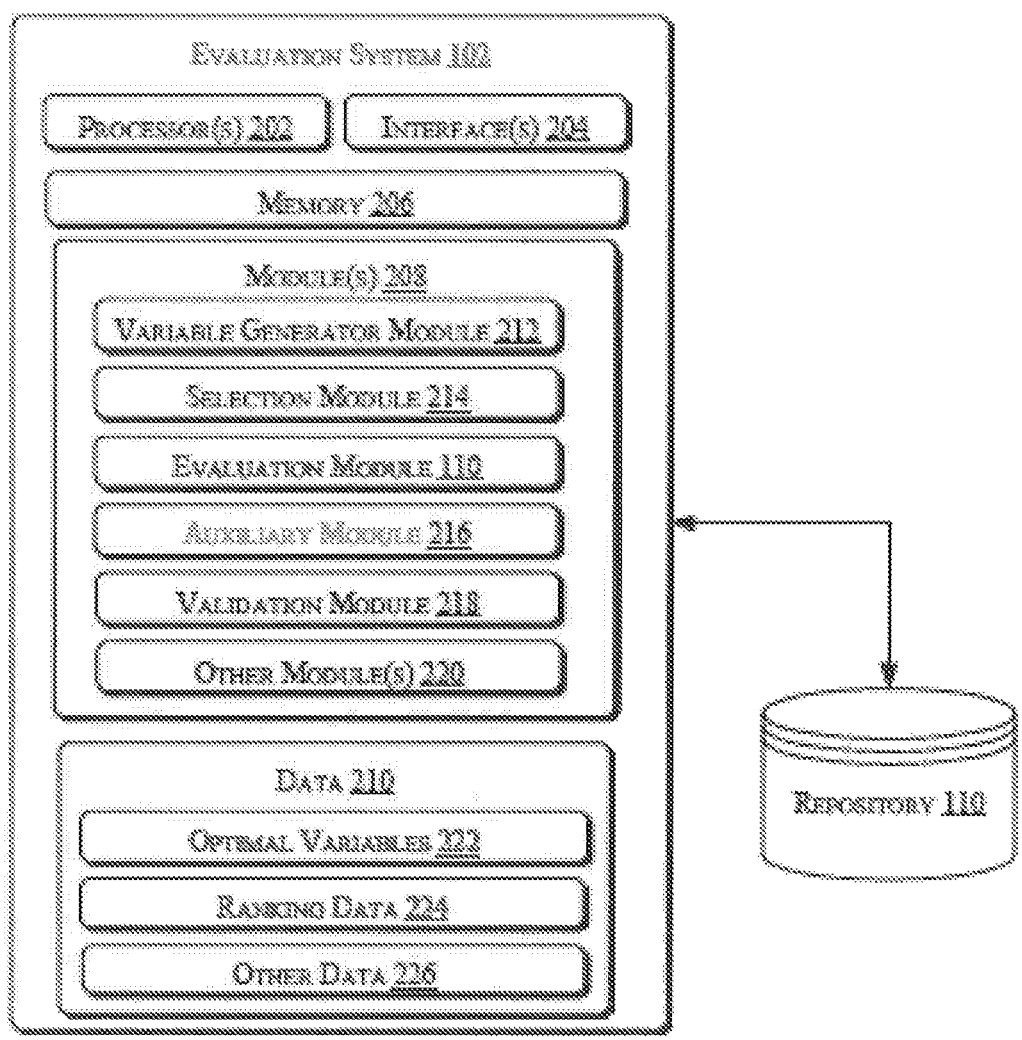
FIG. 2 illustrates a schematic diagram of an evaluation system for evaluating performance of organizational units using Human Capital Value (HCV), according to an embodiment of the present subject matter.
Figure 3:
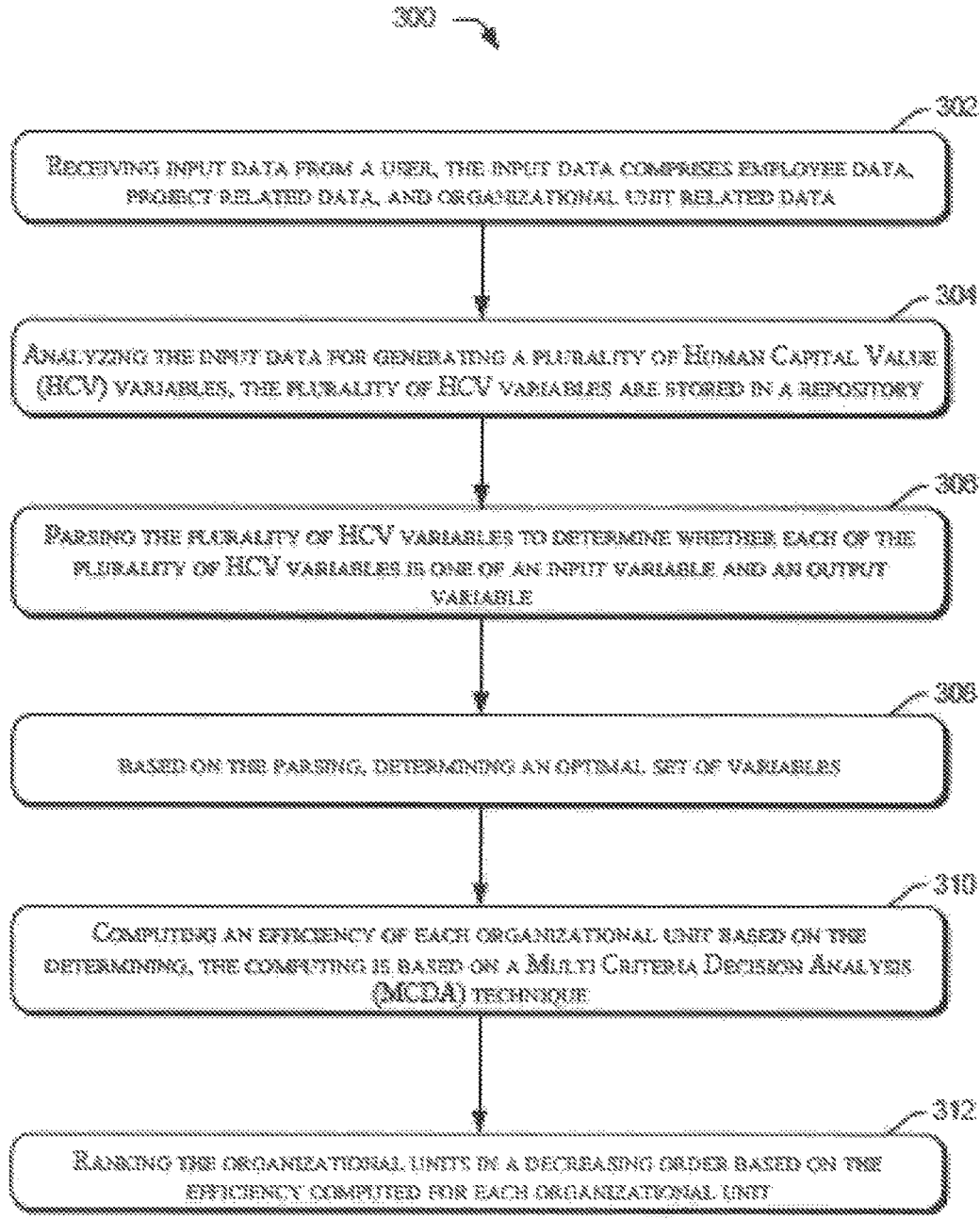
FIG. 3 illustrates a method for evaluating performance of organizational units using HCV, according to an embodiment of the present subject matter.

FIG. 2 illustrates a schematic diagram of an evaluation system for evaluating performance of organizational units using Human Capital Value (HCV), according to an embodiment of the present subject matter. In one implementation, the evaluation system 102 includes processor(s) 202, interface(s) 204, and memory 206 coupled to the processor(s) 202. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 may be configured to fetch and execute computer-readable instructions stored in the memory 206.

The memory 206 may include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

Further, the interface(s) 204 may include a variety of software and hardware interfaces, for example, interfaces for peripheral device(s), such as a product board, a mouse, an external memory, and a printer. Additionally, the interface(s) 204 may enable the evaluation system 102 to communicate with other devices, such as web servers and external repositories.

The evaluation system 102 also includes module(s) 208 and data 210. The module(s) 208 include, for example, a variable generator module 212, a selection module 214, the evaluation module 110, an auxiliary module 216, a validation module 218, and other module(s) 220. The other modules 220 may include programs or coded instructions that supplement applications or functions performed by the evaluation system 102. The data 110 may include optimal variables 222, ranking data 224, and other data 226. Further, the other data 226, amongst other things, may serve as a repository for storing data, which is processed, received, or generated as a result of the execution of one or more modules in the module(s) 208.

Although the data 210 is shown internal to the evaluation system 102, the data 210 can also be implemented external to the evaluation system 102, where the data 210 may be stored within a database communicatively coupled to the evaluation system 102.

In one embodiment of the present subject matter, the evaluation system 102 is implemented for evaluating performance of organizational units using HCV. The HCV may be understood as worth of accumulated experience and skills (competency and proficiency levels in the organizational units) for carrying out main line of business for an organization. This may help the organization to track progress and setting targets of various organizational units. HCV may get accumulated in an organization over a period of time. In an example, the HCV may fall under different categories. Examples of such categories may include, but are not limited to, project, tools, product building and support experience, diversity, and innovation. Examples of different forms of HCV are listed in Table 1 below:

TABLE 1

| Specialized technical knowledge and skills | Support and maintenance experience |
| --- | --- |
| Business and domain knowledge | Leadership, planning, budgeting and monitoring experience |
| Quality and business processes experience | Consulting, problem solving and conceptualization experience |
| Product and solution architecture experience | Sales, marketing, HR and finance expertise |
| Project and program management experience | Research and innovation |

According to an implementation, for the purpose of evaluating performance of organizational units using HCV, the variable generator module 212 of the evaluation system 102 may generate a plurality of HCV variables. In an example, the variable generator module 212 may extract data from the repository 108. In an example, the data may include the performance data and employee data. The performance data may include data pertaining to the performance of employees of an organization. The performance data may be selected by a user for being provided as input to the variable generator module 212. Further, the employee data may include data pertaining to the employees, such as demographic information pertaining to the employees, performance growth of the employees, and the like.

Using the input from the repository 108, the variable generator module 212 may generate the plurality of HCV variables. In an implementation, the variable generator module 212 may identify quantifiable attributes that closely relate to the organization. The quantifiable attributes may either exist or newly identified performance indicators within the organization. In the present example, the quantifiable measures may relate to not just financial performance of the organization. In an example, the plurality of HCV variables that may be generated by the variable generator module 212 may be indicated in Table 1 below:

TABLE 2

| Years of Education after Class XII | Grievances raised |
| --- | --- |
| Post-graduate (Y/N) | Performance appraisal related disagreements |
| Total Experience (years) | Projects worked on |
| Total Efforts (person days) | Customers worked for |
| Total Efforts in leadership roles (person days) | Platforms (technical) worked on |
| Total Efforts in senior designations (person days) | Patents |
| % of Total Efforts in senior designations | Papers |
| Total Efforts in experience range 3-10 years (person days) | White papers + #Articles |
| % of Total Efforts in experience range 3-10 years | Awards and recognition outside organization |
| Total Efforts in experience range >10 years (person days) | Awards and recognition within organization |

As mentioned earlier, Table 2 depicts exemplary individual HCV variables that may be computed for each employee at a particular point in time, such as end of a quarter from the past data. In an example, the past data may be retrieved by the variable generator module 212 from the repository 108. In an implementation, the variable generator module 212 may compute an aggregate of the individual HCV variables. In an example, Table 3 shows exemplary aggregated HCV variables that may be computed for each aggregate level of interest. For example, the aggregate HCV variables may be computed for each branch of the organization at a particular point in time, such as at the end of a quarter, from the past data.

TABLE 3

| Percent of employees in leadership roles | Avg. number of courses per employee |
| --- | --- |
| Percent of total efforts from employees in ASS leadership roles | Avg. number of technical courses per employee |
| Percent of employees in technical/domain leadership roles | Avg. number of domain courses per employee |
| Percent of total efforts from employees in technical/domain leadership roles | Avg. number of leadership courses per employee |
| Percent of employees in senior grades | Avg. number of soft skill courses per employee |
| Percent of total efforts from employees in senior grades | Avg. number of other courses per employee |
| Percent of employees with 3-10 years experience | Avg. number of external certifications (technical) per employee |

In an example, the variable generator module 212 may compute the aggregate HCV variables for different categories, such as age-group, designation-level, role-level, geography level, and the like. Accordingly, the variable generator module 212 generates potential measures of performance. The variable generator module 212 may store the plurality of HCV variables in the repository 108.

Thereafter, the selection module 214 may, based on the plurality of HCV variables, determine an optimal set of variables. In an example, the selection module 214 may parse the plurality of HCV variables to determine if each HCV variable is an input or output variable for the organizational unit in consideration. In an implementation, the selection module 214 may apply a technique, such as domain knowledge, automatic model discovery, and fractional factorial model. In an example, a user may select the technique for being employed by the selection module 214 to determine the optimal set of variables from the plurality of HCV variables.

In case the technique selected by the user is domain knowledge, the user may parse the plurality of HCV variables and determine whether each HCV variable is an input or output for the purposes of evaluating performance of the organizational unit. The determination of the input or output is made by the user based on the domain knowledge of the user. In case of automatic model discovery technique, the selection module 214 may select input or output variables from the ranking provided by executive which will act as ground truth. In an example, the end-user may include an executive or a manager. Considering an example, where $\sigma^E$ represents the ranking of all the DMU's obtained from the executive and $\sigma_i^E$ represents the ranking of the $i^{th}$ DMU. In DEA model, for 'n' number of inputs and 'm' number of outputs, about $\{2^{(n+m)}-1\}$ feasible DEA models may be derived. Accordingly, the objective of the automatic model discovery is to find a combination of inputs and outputs for DEA model that matches the rankings obtained from the executives.

Another technique that may be employed by the selection module 214 is based on fractional factorial. The fractional factorial technique may be understood as a statistical methodology for systematically Identifying input or output variables from the plurality of HCV variables.

In an example, the selection module 214 may identify an optimal set of variables from the input and output variables for analyzing the performance of the organizational unit. The selection module 214 may store the optimal set of variables as the optimal variables 222.

In an implementation, the optimal set of variables may be received by the evaluation module 110. In addition, the evaluation module 110 may extract data pertaining to the optimal set of variables from the repository 108. In an example, the evaluation module 110 may apply the MCDA techniques, such as DEA, TOPSIS, and AHP on the optimal set of variables and the data pertaining to the optimal set of variables to evaluate the efficiency of the organizational unit. In the present example, the MCDA technique to be applied by the evaluation module 110 may be selected by the user. As the MCDA techniques are described in conjunction with FIG. 1, for the sake of brevity, the MCDA techniques are not explained again.

The evaluation module 110 may calculate the efficiency of the organizational units using the optimal set of variable and the data pertaining to the variables. Further, the evaluation module 110 may rank the organizational units in a decreasing order based on the efficiency calculated. In an example, the user may select one or more MCDA techniques for being applied by the evaluation module 110 for evaluating efficiency of the organizational unit. Accordingly, the users may analyze the results as may be provided by different MCDA techniques. The evaluation module 110 may store the rankings provided to each organizational unit as the ranking data 224.

In an implementation, the users may assign main criteria measures and under each main criteria user can define sub criteria measures based on input and output variables. Further, the user may assign weights to each main criteria in such a way that sum of weights of the main criteria measures are equal to one. In addition, the user may assign weights to each sub criteria under main criteria such that the sum of weights of sub criteria measures is equal to one. Based on the weights assigned to the main criteria and sub criteria, the evaluation module 110 may compute the efficiency of the organizational unit by taking ratio of weighted sum of output variables to weight sum of input variables.

In an embodiment, the evaluation module 110 may facilitate in identification of improvements that may be made in each HCV variable for inefficient/lower performing organizational units. In an example, the evaluation system 102 uses equations 7 and 8 in order to calculate improvements. After solving DEA for DMU under consideration, values of $\lambda$ may be obtained. By putting these $\lambda$ values along with corresponding input and output variable values in equations 7 and 8, the evaluation system 102 may get optimal values of variables. Thereafter, the evaluation system 102 may subtract these optimal values from original values of the variables to get improvements in all variables for the DMU under consideration. The above described method is a standard method of calculation of improvements that may be needed in lower performing units. For example, the evaluation module 110 may identify where the lower performing units are lacking in human capital. Further, the evaluation module 110 may indicate the improvements that can be performed in order to improve performance of the lower performing organizational units. In addition, the evaluation module 110 may facilitate analysis of improvements that may be made based on one HCV in different organizational units.

Further, the evaluation module 110 may perform sensitivity and stability analysis of the organizational units. For example, to perform the sensitivity analysis, the evaluation module 110 may change proportion of inputs and outputs simultaneously and obtain the results. In an implementation, the stability analysis may be performed by the evaluation module 110, in case of any data error. The results obtained by the stability analysis may be applied to a specific organizational unit or to all organizational units within the organization.

Furthermore, the evaluation module 110 may detect outliers in order to identify spurious data points. Based on the outlier's detection, the evaluation module 110 may prevent from drawing erroneous conclusions and may make DEA robust. In an example, to detect the outliers, the evaluation module 110 may employ a plurality of techniques for detecting the outliers. For example, the evaluation module 110 may detect the outliers based on frequency of occurrence of a unit and based on a sum of cumulative weights of a unit while testing efficiency of other organizational units. Once the outliers have been detected by the evaluation module 110, the outliers may be removed while calculating efficiencies of the organizational units to provide accurate results.

In an implementation, once the efficiency of an organizational unit has been evaluated, the evaluation system 100 may also employ the auxiliary module 216 to derive auxiliary measures. In an example, the users may define the auxiliary measures either on the basis of the input variables and the output variables as selected by the selection module 214. In an alternative example, the users may define the auxiliary measures based on the HCV variables that may be generated by the variable generator module 212. In operation, the auxiliary module 216 may receive data pertaining to the variables (either HCV or input/output) from the repository 108. Based on the variables and the data pertaining to the variables, the auxiliary module 216 may calculate auxiliary measure value for each organizational unit within the organization. In an implementation, the calculation of the auxiliary measure values is based on auxiliary variables. In an example, the auxiliary variables may be understood as a ratio of output variables and the input variables. The auxiliary variables are easy to understand and are useful while comparing different organizational units.

Thereafter, for each auxiliary measure, the auxiliary module 216 may assign a rank to each organizational unit. In an example, the auxiliary module 216 may rank the organizational units in a decreasing order of measure value. The auxiliary module 216 may compute an average of these ranks for each organizational unit. The average rank may be referred to as an auxiliary measure rank. The auxiliary measure rank may be employed by the evaluation system 100 for validating and comparing the ranks as provided by the evaluation module 110.

In an example, the evaluation system 100 may employ the validation module 218 to validate the rankings provided to the organizational units. In case the user wants to validate the results as provided by the evaluation module 110, the evaluation system 100 may invoke the validation module 218 to compare the rankings provided by the evaluation module 110 with those of the auxiliary module 216. Therefore, the validation module 218 may compare the rankings that may be generated based on the MCDA technique with the rankings based on the auxiliary measure values. Based on the comparison, the validation module 218 may generate results. Based on the results, the users may select a best model out of the various DEA and MCDA models that meets the requirements of the organization.

In operation, the performance of various organizational units in an IT organization was evaluated. In an example, relative performance of 5 units was calculated under the category of leadership with four input and five output variables. Further, the evaluation system 100 employed different DEA models, TOPSIS and auxiliary measure to evaluate the efficiency of the organizational units. The input and output variables are listed in the table 4 as provided below:

TABLE 4

| Input Variables | Output Variables |
| --- | --- |
| Employees | Total Revenue |
| Total Leader Efforts | Total Roles |
| Total Efforts | Total Projects |
| Total Cost | Total competencies |
|  | Total courses and certifications |

The validation module 218 may receive the variables as provided in the above table along with the rankings that may be generated by the evaluation module 110 as well as the auxiliary module 216. Based on the variables and the rankings, the validation module 218 may generate a report as provided in the below table. The report includes a comparison of results obtained by employing various models. An exemplary report is depicted in the Table 5:

TABLE 5

| Unit Name | Super Efficiency | BCC Output | BCR Output | TOPSIS | Auxiliary Measures |
| --- | --- | --- | --- | --- | --- |
| Unit 1 | 2.121 | 1 | 1 | 0.468 | 0.487 |
| Unit 2 | 2.02 | 1 | 1 | 0.464 | 0.369 |
| Unit 3 | 1.68 | 1 | 1 | 0.458 | 0.405 |
| Unit 4 | 1.563 | 1 | 1 | 0.472 | 0.43 |
| Unit 5 | 1.429 | 1 | 1 | 0.464 | 0.492 |

Table 5 depicts the efficiency measures obtained from different methods. Based on the Table 5, the users may identify which technique or model they would like to employ for determining the efficiency of the organizational units in the organization.

In operation, the evaluation system 102 may employ the automatic model discovery method to determine the model that suits the rankings as may be provided by the executives. In an example, let 'k' be the number of DMU's and 'N' be the number of variables that can be considered as inputs and outputs. Using super efficiency DEA model, we rank the DMUs. Let $\sigma^m$ represent the ranking of all the DMU's obtained using DEA super efficiency model. Based on the rankings, the evaluation system 102 may perform the variable selection as described below.

In an implementation, the base variables may be selected as per the domain knowledge. For example, the number of employees may be selected as an Input variable and billing may be selected as an output variable. In an example, this may be referred to as a base model, with single input and output variable. Let u and v represent the single output and input variables that are selected as the base model and let n∈N be the set of remaining number of variables to be selected. Thus, the set N comprises of {u, v, 1, 2 . . . n} variables. As u and v have already been selected, the variables to be selected are n={1, 2 . . . 7}.

Thereafter, the remaining variables may be iteratively added to the base model, one at a time, once as an input variable and then as an output variable. The evaluation system 102 may then compute the relative efficiency of the new base model and rank the DMU's. Based on the ranking, the evaluation system 102 may compare the new base model with the rankings obtained by the executives using the Kendall Tau (τ) ranking coefficient. Let $\sigma^{Bj}$ represent the ranking obtained by the new base model for the $j^{th}$ iteration. In each of the iteration, the evaluation system 102 may solve one DEA model with new variable added either as an input variable or as an output variable. Further, the evaluation system 102 may select the variable where ranking coefficient is maximal i.e., $\max_{j\in 2n}\tau(\sigma^{Bj},\sigma^E)$.

Further, in each iteration, the evaluation system 102 may add and select a new variable until the ranking coefficient shows improvement. If no improvements are detected, the number of iterations required may be $\Sigma_{i=0}^{n}[2n-2(i)]$ that is, n(n-1)+2n.

In an example, Table 6 depicts (2n) number of iterations that may be performed for selecting the first variable. Table 6 illustrates variable selection using model discovery method with base model comprising of two variables.

TABLE 6

| Iteration | Input Variable | Output Variable | Kendall Tau (τ) |
| --- | --- | --- | --- |
| 1 | V, 1 | U | $(\sigma^{B1}, \sigma^E)$ |
| 2 | V, 2 | U | $(\sigma^{B2}, \sigma^E)$ |
| : | : | | |

TABLE 6-continued

| Iteration | Input Variable | Output Variable | Kendall Tau ($\tau$) |
|---|---|---|---|
| : | V, n | U | |
| : | V | U, 1 | |
| : | V | U, 2 | |
| : | : | : | |
| 2 n | V | V, n | $(\sigma^{B2n}, \sigma^E)$ |

As mentioned above, the base model includes two variables, u and v selected as input variable and output variable. In each of the iteration, the evaluation system 102 may add a variable to the base model and omit the earlier variable. Thereafter, the evaluation system 102 may compute the relative efficiency for all the k number of DMU's. Based on the relative efficiency, the evaluation system 102 may compute a ranking coefficient. Based on the ranking coefficient. The evaluation system 102 may select the variable where Kendall Tau is maximum. In an example, Kendall Tau for iteration 2 is maximal. Then, variable 2 is selected as input and included in the base model. Table 6 above shows the iterations with base model as (v, 2) as input variables and (u) as output variable.

Further, Table 7 depicts variable selection using model discovery method with the base model comprising of three variables:

TABLE 7

| Iteration | Input Variable | Output Variable | Kendall Tau ($\tau$) |
|---|---|---|---|
| 1 | V, 2, 1 | U | $(\sigma^{B1}, \sigma^E)$ |
| 2 | V, 2, 3 | U | $(\sigma^{B2}, \sigma^E)$ |
| : | V, 2, n | U | |
| | V, 2 | U, 1 | |
| | V, 2 | U, 3 | |
| : | : | : | |
| (2n − 2) | V, 2 | V, n | $(\sigma^{B(2n-2)}, \sigma^E)$ |

In an implementation, the automatic model discovery method may be applied to one scenario when the ranking is derived through noisy ground truth. Here noisy means the rankings provided by the executives may deviate. The ranks of the organizational units may defer from one executive to another. In an example, the ranking obtained by the ground truth model may be distorted by ±3 for all DMUs. The KT correlation coefficient between the ground truth ranking and the distorted ranking is 0.911. Table 7 shows three iteration results for model discovery with noisy ground truth. In second iteration number, KT value improved by the addition of the selected variable, but in third iteration, the KT value decreased by addition of the selected variable. Hence, the variables of the second iteration are selected by the automatic model discovery method employed by the evaluation system 102.

The variables selected by the automatic model discovery method are input variables: v, 1, 2, 4; output variables: u, 5, 6, 7; the KT ranking correlation coefficient, Kendall Tau: 0.869. Accordingly, the automatic model discovery method may facilitate in discovering a model, which matches maximally with the set of variables as in the noisy ground truth model.

The list of variables considered for demonstration of the methods applied to various scenarios is shown in Table 8 below.

TABLE 8

| Index | List of Variables | Description |
|---|---|---|
| V | Employees | Allocated employees count in an unit |
| U | Billing | Sum of total billing against projects proportionate to allocations for a year |
| 1 | Efforts | Total employee efforts up to given date |
| 2 | Technical Efforts | Employee efforts in technical roles (example: developer role, analyst role) |
| 3 | Cost Budget | Sum of total cost budget assigned to a unit during the year |
| 4 | Projects | Total number of active projects in an unit from year under consideration |
| 5 | Competencies Count | Sum of employee competencies held (cumulative) with proficiency levels L2, L3, L4 |
| 6 | Courses and Certifications Count | Total count of courses and certificates held of employees in an unit |
| 7 | Roles | Total number of people with distinct roles |

FIG. 2 illustrates a method 200 for evaluating performance of organizational units using HCV, according to an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communications network.

The order in which the method 200 is described is not intended to be construed as a limitation, and any number of the described method blocks can be combined in any order to implement the method 200, or an alternative method. Furthermore, the method 200 can be implemented in any suitable hardware, software, firmware or combination thereof.

At block 202, the method 200 may include receiving input data spread across an enterprise, from a user. The input data may include employee data, project related data, and organizational unit data. In an implementation, the variable generator module 212 may receive the input data spread across the enterprise, from the user. Further, the employee data may include the data pertaining to the employees of the organization. In an example, the employee data, the project related data, and the organizational unit data may be stored in the repository 108.

At block 204, the method 200 may include analyzing the input data for generating a plurality of HCV variables. In an example, the plurality of HCV variables may be stored in the repository 108. In an implementation, the variable generator module 212 may analyze the input data to generate the plurality of HCV variables.

At block 206, the method 200 may include parsing the plurality of HCV variables to determine whether each of the plurality of HCV variables is one of an input variable and an output variable. In an implementation, the selection module 214 may parse the plurality of HCV variables to determine the input variables and the output variables from the plurality of HCV variables.

At block 208, the method 200 may include determining an optimal set of variables, based on the parsing. In an implementation, the selection module 214 may determine an optimal set of variables based on the parsing of the plurality of HCV variables.

At block 210, the method 200 may include computing an efficiency of each organizational unit based on the determining. The computing is based on a multi criteria decision analysis (MCDA) technique. In an implementation, the evaluation module 110 may compute the efficiency of each organizational unit. The MCDA techniques may include DEA or TOPSIS or AHP.

Further, at block 212, the method 200 may include ranking the organizational units in a decreasing order based on the efficiency computed for each organizational unit. In an implementation, the evaluation module 110 may rank the organizational units in the decreasing order.

Although embodiments for methods and systems for evaluating performance of organizational units using HCV have been described in a language specific to structural features and/or methods, it is to be understood that the present subject matter is not necessarily limited to the specific features or methods described. Rather, the specific features and methods are disclosed as exemplary embodiments for evaluating performance of organizational units using HCV.

What is claimed is:

1. A method for evaluating performance of organizational units using Human Capital Value (HCV):
    receiving, by a processor, input data spread across an enterprise from a user, wherein the input data comprises employee data, project related data, and organizational unit data for performance evaluation;
    analyzing, by the processor, the input data for generating HCV variables by identifying quantifiable attributes that closely relate to the enterprise that exist or newly identified performance indicators within the enterprise, wherein the HCV variables are stored in a repository;
    parsing, by the processor, the HCV variables to determine whether each of the plurality of HCV variables is one of an input variable, an output variable, and a variable to be neglected;
    based on the parsing, determining, by the processor, an optimal set of variables;
    performing sensitivity analysis by changing proportion of the input variable and the output variable simultaneously; and
    computing, by the processor, an efficiency of each organizational unit based on the determining, the computing is based on a Multi Criteria Decision Analysis (MCDA) techniques, wherein the organizational units are ranked in a decreasing order based on the computing, wherein computing includes detecting outliers based on a frequency of occurrence of a unit and a sum of cumulative weights of a unit while testing efficiency of the organizational units, and removing the outliers while computing efficiency of each organizational unit, thereby preventing from drawing erroneous conclusions and make a Data Envelopment Analysis (DEA) method robust, wherein the MCDA technique includes the DEA method based on convex limiting surface consisting of linear planes, wherein the DEA method comprises one of a Charnes, Cooper, Rhodes (CCR) model that facilitates in deriving weights from actual data, a dual form CCR model based on a Decision Making Unit (DMU) under consideration and efficiency of the DMU, a cross efficiency model to compute performance of one DMU with respect to output optimal weights and input optimal weights of another DMU, and a super efficiency model for ranking efficient DMUs,
    wherein the step of determining the optimal set of variables includes selecting base variables with a single input variable and a single output variable based on a domain knowledge and remaining variables are iteratively added to a base model, one at a time, once as an input variable and then as an output variable,
    wherein the processor computes a relative efficiency of the base model and rank the DMUs, wherein the processor further compares the base model with the ranking obtained from executives using a Kendall Tau ranking coefficient,
    wherein in each of the iteration, the processor solves one DEA method with a new variable added as an input variable or as an output variable, omit an earlier variable, and select a variable when the Kendall Tau ranking coefficient is maximal.

2. The method of claim 1, wherein the parsing is based on the rankings assigned to the organizational units, the rankings belong to the optimal set of variables where all variables are one of known, partially known, and not known.

3. The method of claim 1, further comprising calculating, by the processor, an auxiliary measure value for each organizational unit, wherein the calculation is based on the auxiliary variables, derived from optimal set of variables and data pertaining to the optimal set of variables.

4. The method of claim 2, further comprising, providing, by the processor, auxiliary ranks to each organizational unit based on the auxiliary measure value.

5. The method of claim 3, further comprising comparing the ranks and the auxiliary ranks of each organizational unit, wherein based on the comparison, the rankings are validated and generates report with comparison of results from the super efficiency model, a Technique for Order of Preference by Similarity to Ideal Solution (TOPSIS) model, and auxiliary measures.

6. The method of claim 1, wherein the computing comprises ranking the organizational units based on weights given to each variable.

7. The method of claim 6, wherein the weights are associated with main criteria and at least one sub-criteria of the organizational unit.

8. The method of claim 1, wherein the determining is based on an automatic model discovery that facilitates in discovering a model that matches maximally with the set of variables.

9. An evaluation system for evaluating performance of organizational units using Human Capital Value (HCV), the evaluation system comprising:
    a processor;
    a variable generator module, executable by the processor, to:
        receive input data spread across the enterprise from a user, wherein the input data comprises employee data, project related data, and organizational unit data for performance evaluation; and
        analyze the input data for generating HCV variables by identifying quantifiable attributes that closely relate to the enterprise that exist or newly identified performance indicators within the enterprise, wherein the HCV variables are stored in a repository;
        parse each of the HCV variables to determine whether each of the HCV variables is one of an input variable, an output variable, and a variable to be neglected;
        determine an optimal set of variables from the HCV variables;

perform sensitivity analysis by changing proportion of the input variable and the output variable simultaneously; and an evaluation module (110), executable by the processor, to:

compute efficiency of each organizational unit based on the identification, wherein the computation is based on a Multi Criteria Decision Analysis (MCDA) techniques, wherein computing efficiency includes detecting outliers based on a frequency of occurrence of a unit and a sum of cumulative weights of a unit while testing efficiency of the organizational units, and removing the outliers while computing efficiency of each organizational unit, thereby preventing from drawing erroneous conclusions and make a Data Envelopment Analysis (DEA) method robust, wherein the MCDA technique includes the DEA method based on convex limiting surface consisting of linear planes, wherein the DEA method comprises one of a Charnes, Cooper, Rhodes (CCR) model that facilitates in deriving weights from actual data, a dual form CCR model based on the DMU under consideration and efficiency of the DMU, a cross efficiency model to compute performance of one DMU with respect to output optimal weights and input optimal weights of another DMU, and a super efficiency model for ranking efficient DMUs; and rank each of the organizational unit based on the efficiency of each organizational unit, wherein the evaluation system determines the optimal set of input-output variables from the HCV variables by selecting base variables with a single input variable and a single output variable based on a domain knowledge and remaining variables are iteratively added to a base model, one at a time, once as an input variable and then as an output variable, wherein the evaluation system computes a relative efficiency of the base model and rank the DMUs, wherein the processor further compares the base model with the ranking obtained from executives using a Kendall Tau ranking coefficient, wherein in each of the iteration, the evaluation system solves one DEA method with a new variable added as an input variable or as an output variable, omit an earlier variable, and select a variable when the Kendall Tau ranking coefficient is maximal.

10. The system of claim 9, further comprises an auxiliary module, executable by the processor, to:

calculate an auxiliary measure value for each organizational unit, wherein the calculation is based on auxiliary variables, derived from the optimal set of variables and data pertaining to the optimal set of variables; and provide auxiliary ranks to each organizational unit based on the auxiliary measure value.

11. The system of claim 9, wherein the MCDA technique comprises one of a Technique for Order of Preference by Similarity to Ideal Solution (TOPSIS) method based on Euclidean distance, and an Analytic Hierarchy Process (AHP).

12. The system of claim 9, further comprises a validation module, executable by the processor, to compare the ranks and the auxiliary ranks of each organizational unit, wherein based on the comparison the rankings are validated, wherein the validation module generates report with comparison of results from the super efficiency model, a TOPSIS model, and auxiliary measures.

13. A computer program product having embodied thereon a computer program for evaluating performance of organizational units using Human Capital Value (HCV), the computer program product comprising:

a program code, executable by a processor, for receiving input data spread across an enterprise from a user, wherein the input data comprises employee data, project related data, and organizational unit data for performance evaluation;

a program code, executable by the processor, for analyzing the input data for generating HCV variables by identifying quantifiable attributes that closely relate to the enterprise that exist or newly identified performance indicators within the enterprise, wherein the HCV variables are stored in a repository;

a program code, executable by the processor, for parsing the HCV variables to determine whether each of the plurality of HCV variables is one of an input variable, an output variable, and a variable to be neglected;

based on the parsing, determining, by the processor, an optimal set of variables;

a program code, executable by the processor, for performing sensitivity analysis by changing proportion of the input variable and the output variable simultaneously; and a program code, executable by the processor, for computing an efficiency of each organizational unit based on the determining, the computing is based on a Multi Criteria Decision Analysis (MCDA) techniques, wherein the organizational units are ranked in a decreasing order based on the computing, wherein computing includes detecting outliers based on a frequency of occurrence of a unit and a sum of cumulative weights of a unit while testing efficiency of the organizational units, and removing the outliers while computing efficiency of each organizational unit, thereby preventing from drawing erroneous conclusions and make a Data Envelopment Analysis (DEA) method robust, wherein the MCDA technique includes the DEA method based on convex limiting surface consisting of linear planes, wherein the DEA method comprises one of a Charnes, Cooper, Rhodes (CCR) model that facilitates in deriving weights from actual data, a dual form CCR model based on the DMU under consideration and efficiency of the DMU, a cross efficiency model to compute performance of one DMU with respect to output optimal weights and input optimal weights of another DMU, and a super efficiency model for ranking efficient DMUs, wherein the step of determining the optimal set of variables includes selecting base variables with a single input variable and a single output variable based on a domain knowledge and remaining variables are iteratively added to a base model, one at a time, once as an input variable and then as an output variable, wherein the program code executable by the processor computes a relative efficiency of the base model and rank the DMUs, wherein the processor further compares the base model with the ranking obtained from executives using a Kendall Tau ranking coefficient, wherein in each of the iteration, the program code executable by the processor solves one DEA method with a new variable added as an input variable or as an output variable, omit an earlier variable, and select a variable when the Kendall Tau ranking coefficient is maximal.

* * * * *